United States Patent [19]

Cailliot

[11] Patent Number: 4,972,769
[45] Date of Patent: Nov. 27, 1990

[54] APPLIANCE FOR PEELING FRUIT AND VEGETABLES

[76] Inventor: Serge Cailliot, Le Manoir de Carabillon, Cordey, FR-14700 Falaise, France

[21] Appl. No.: 327,803

[22] PCT Filed: May 25, 1988

[86] PCT No.: PCT/FR88/00260
§ 371 Date: Jan. 27, 1989
§ 102(e) Date: Jan. 27, 1989

[87] PCT Pub. No.: WO88/09639
PCT Pub. Date: Dec. 15, 1988

[30] Foreign Application Priority Data
Jun. 5, 1987 [FR] France .................. 8707883

[51] Int. Cl.[5] ............... A47T 17/14; A23N 7/00
[52] U.S. Cl. .................... 99/593; 30/276; 99/541; 99/588; 99/594
[58] Field of Search ............ 99/537, 486, 539–541, 99/546, 547, 584, 588–591, 593–595, 623, 635–637, 643; 426/481, 482, 484, 512, 514, 518; 30/276

[56] References Cited

U.S. PATENT DOCUMENTS

| 1,255,657 | 2/1918 | Steinheimer | 30/276 |
| 1,804,977 | 5/1931 | Gallison et al. | 30/276 |
| 2,091,827 | 8/1937 | Mercatoris | 30/276 |
| 2,684,532 | 7/1954 | Sumstad | 30/276 |
| 3,058,149 | 10/1962 | Schmid et al. | 99/593 |
| 3,113,603 | 12/1963 | Gardiner . | |
| 4,430,932 | 2/1984 | Tichy et al. | 99/594 |
| 4,641,431 | 2/1987 | Leming et al. | 30/276 |
| 4,656,936 | 4/1987 | Bardon | 99/593 |
| 4,771,682 | 9/1988 | Ishikawa | 99/593 |

FOREIGN PATENT DOCUMENTS 1248668 11/1960 France .
506982 6/1971 Switzerland .

Primary Examiner—Timothy F. Simone
Attorney, Agent, or Firm—Eckert, Seamans, Cherin & Mellott

[57] ABSTRACT

In an appliance for peeling fruit and vegetables, the appliance comprising an electric motor (1) driving a rotor (2) inside a cover (6), the axis of rotation (21) of the rotor being perpendicular to the surface to be peeled, and the rotor being loosely or pivotally mounted on the axis of rotation and being driven at a speed such that the tangential speed of the blades (16) carried by the rotor is at least equal to 7 meters per second.

10 Claims, 3 Drawing Sheets

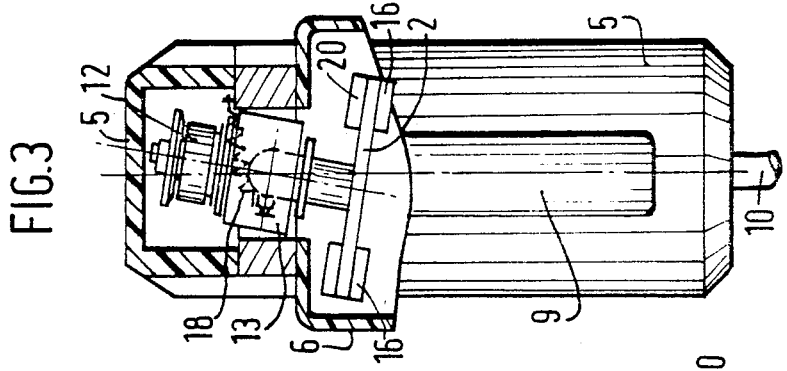
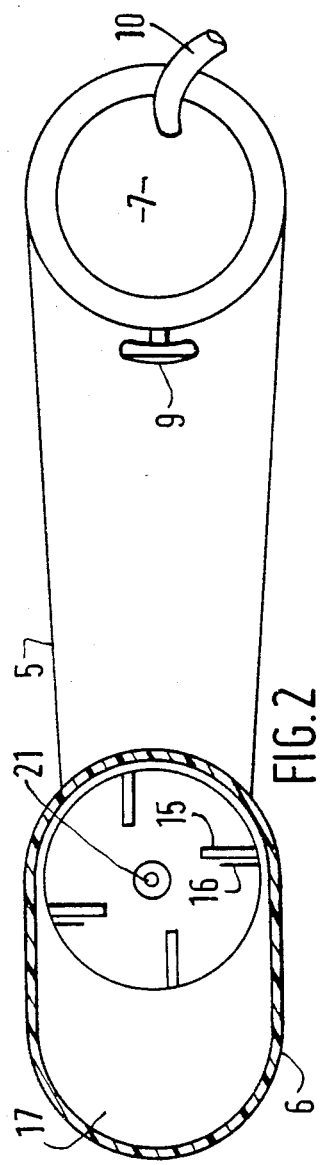
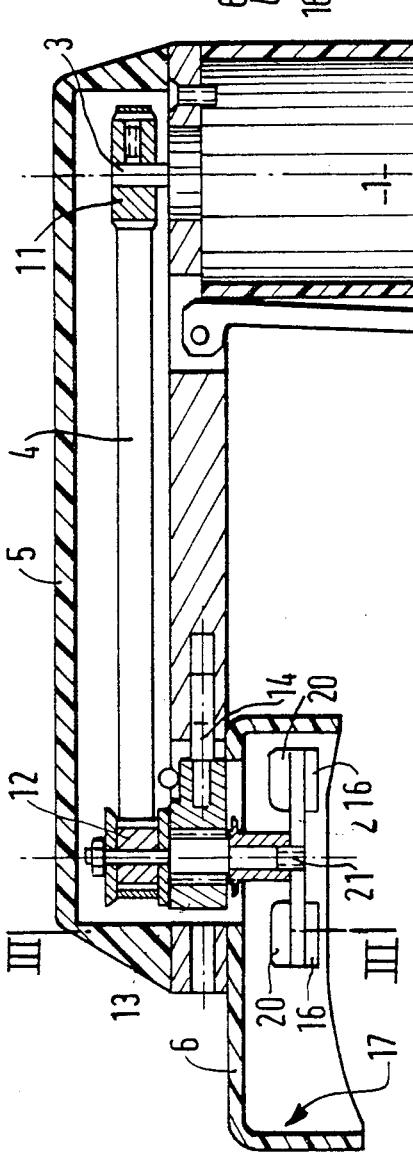

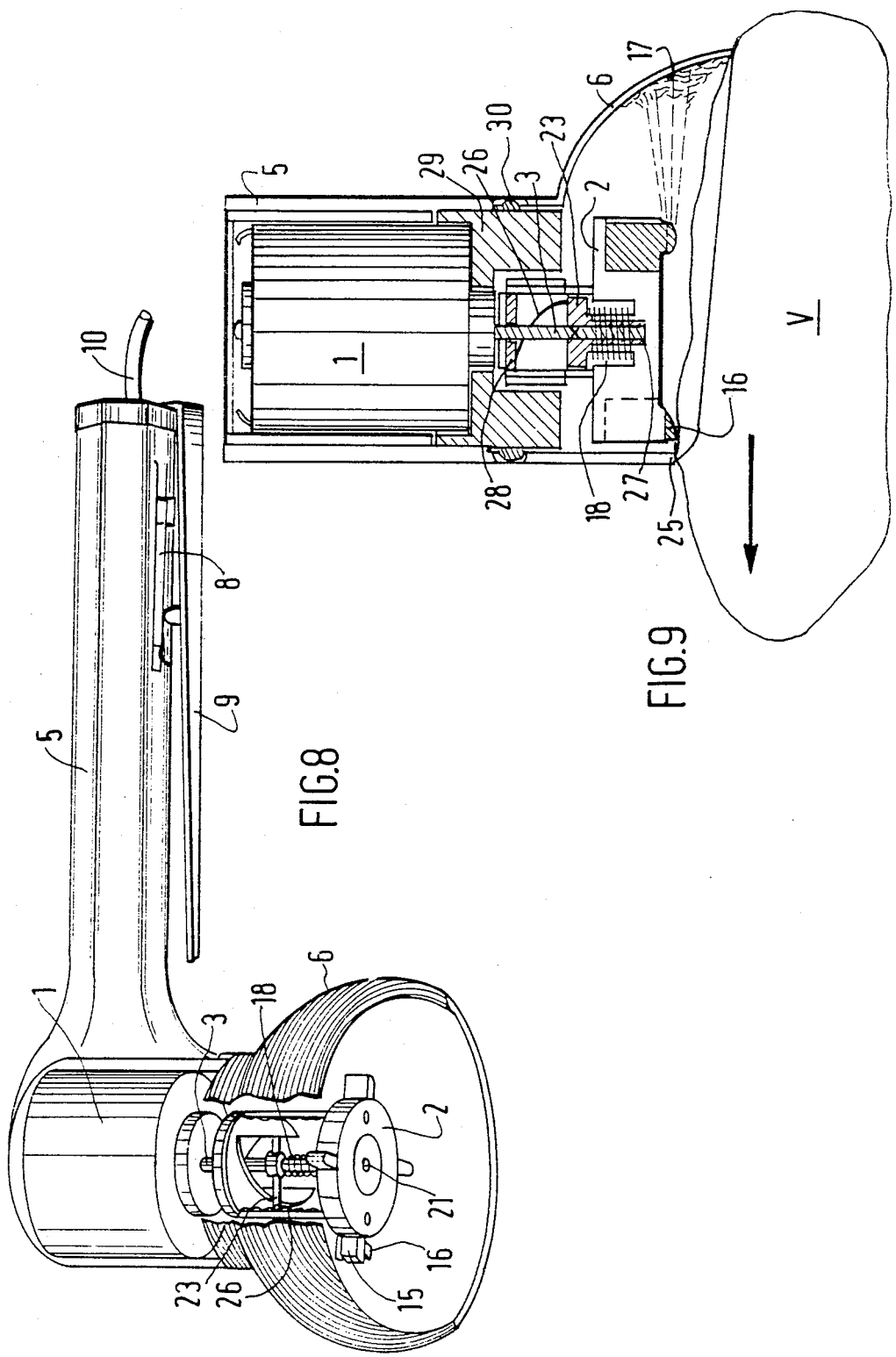

APPLIANCE FOR PEELING FRUIT AND VEGETABLES

BACKGROUND OF THE INVENTION

1. Field of the Invention:

The present invention relates to an appliance for peeling fruit and vegetables, and particularly, but not exclusively, to a hand-held appliance for home use.

2. Description of the Related Art:

The peeling or paring of various foodstuffs such as fruit or vegetables consists in separating the skin which normally protects the fruit or vegetable from the body or pulp thereof. Traditionally, this operation is performed by means of an appropriately sharpened knife, with the edge of the blade applying high pressure to the boundary region between the pulp and the skin, thereby separating them.

For hand peeling, i.e. peeling with the fruit being held in the hand, a considerable progress for clumsy people was obtained when an improved form of knife appeared, sometimes called "an economizer", having a surface for bearing against the outside of the vegetable and separated by a given height from the blade per se. Thus each pass over the fruit removes only a given thickness of skin, but only over a limited width and only on application of a relatively large amount of force.

With particular reference to peeling fruit, proposals have already been made to mechanize this operation by applying successive fruit to a device operating on the principle of a lathe, with the fruit being mounted between spikes, and with one or more fixed or rotary tools being brought to the periphery of the fruit in order to imitate manual peeling, i.e. in order to detach a continuous piece of peel.

U.S. Pat. No. 3,113,603 describes a device having a rotary knife with a cylindrical cutting edge combined with a disk for supporting the cutting edge and provided with windows which are sharpened in the plane of the disk for cutting off peel.

However, such devices are not suitable for peeling vegetables, firstly because of the high rate of wear on the cutting edges, in particular when peeling products whose skins contain earth, e.g. potatoes, and secondly because of the irregular shapes and different degrees of hardness to be found in vegetables. That is why vegetables are peeled industrially by means of abrasive devices which process vegetables in bulk under a flow of water, but which are subject to very high losses of weight during peeling.

Swiss patent No. 506,982 describes a vegetable peeler comprising a handle containing an electric motor whose shaft drives a rough-surfaced cylinder which is partially surrounded by a protective envelope having water admission means. Operation is analogous to that of a grater and is poorly adapted to following the irregular outline of certain vegetables. In addition, in the absence of water feed, the tool clogs up quickly and becomes completely ineffective.

The object of the present invention is to mitigate these drawbacks and to provide a peeling appliance capable of being actuated by hand and suitable for peeling fruit or vegetables very quickly regardless of their consistency, without requiring cutting effort and with practically no pressure on the surface to be processed.

SUMMARY OF THE INVENTION

According to the present invention, the peeling appliance including an electric motor mounted inside a housing, having its shaft projecting outside the housing and driving a rotary member, is characterized in that it includes a rotor whose bottom surface carries blades at a height of a few tenths of a millimeter, with the axis of rotation of the rotor being perpendicular, in the working position, to the surface to be peeled the, or each, blade being driven at a tangential speed of more than 7 meters per second.

The rotor carries one or more small blades which may optionally be sharp, and which project a few tenths of a millimeter above the plane of rotation. The rotary member or rotor is constituted by an arm or preferably by a disk.

The appliance thus operates by applying a new principle. In particular, its blades need not be sharp. Unlike all prior devices, the skin is separated from the pulp not by cutting, but by impact at high speed. Such impact produces a shock wave inside the fruit due to the difference in hardness between the skin and the pulp. The reaction of this shock wave opposing the direction of impact causes the skin to separate. Under the influence of these impacts, the skin is fragmented and separated from the pulp or internal portion of the vegetable. Thus, the appliance does not operate like a grater whose teeth would naturally be obstructed very quickly as a function of the speed.

In accordance with the invention, the rotary member rotates about an axis which is perpendicular to the surface to be peeled or to the direction of displacement of the rotor, whereas in the prior art the tools rotated about an axis parallel to the surface to be peeled.

According to another characteristic of the invention, the rotary member is mounted inside a cover which prevents particles of skin from being projected around the appliance. These particles are collected in a sort of tank which agglomerates them and enables them to move down progressively under gravity.

According to another characteristic of the invention, the rotary member is pivotally mounted inside the cover about an axis which is orthogonal to the rotor axis when the rotor is at rest, with the rotor hub being connected to the drive shaft by means of a resilient belt.

Thus, the rotor or arm is capable of following the shape of a fruit or vegetable without difficulty, with the tension on the belt being limited even when the rotor is pivoting.

In another embodiment, the rotor is slidably mounted on the drive shaft in order to be able to follow surface irregularities in the plant to be peeled.

Other characteristics and advantages of the present invention appear from the following description of a particular embodiment given purely by way of non-limiting example and with reference to the accompanying drawings in which:

BRIEF DESCRIPTION OF THE DRAWINGS

FIG. 1 is an elevation view in section through the appliance;

FIG. 2 is a plan view;

FIG. 3 is a section view on line III—III through the appliance;

FIG. 8 and 9 are respectively a partially cut-away perspective view and a vertical section through another method of mounting the rotor on the drive shaft.

DESCRIPTION OF THE PREFERRED EMBODIMENTS

Figure 4:
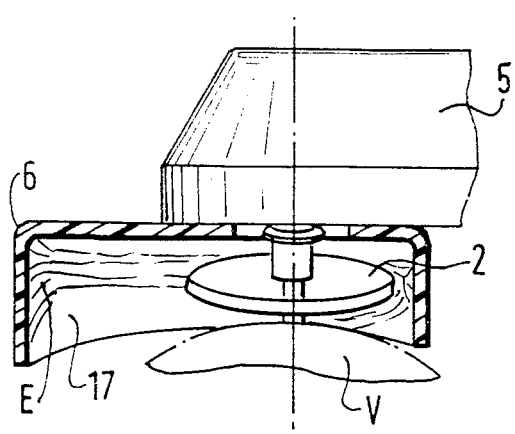
FIG. 4 is a diagram illustrating peel ejection.

In FIGS. 1 to 3, the electric motor 1 is received in a housing 5, a portion of which constitutes a handle, and its outlet shaft 3 drives the disk-shaped rotary member 2 about an axis 21 by means of a belt 4 included inside the housing 5. In accordance with the invention, the speed of rotation of the motor is such as to drive the blades at a tangential speed of not less than 7 m/s, and preferably reaching 20 m/s, without upper limit. In order to protect the operator from coming into contact with the rotor 2 and with projected peel, the rotor 2 is advantageously contained in a lightweight cover 6 which is fixed to the housing 5 and whose bottom portion is open.

The cover 5 is closed by a removeable plug 7. Electrical contact is established by a switch 8 under finger pressure on a trigger 9.

When the appliance is held in the hand and a finger is pressed against the trigger 9, the motor 1 is switched on, thereby rotating its shaft 3 and the rotor 2. The fruit or vegetable can be held directly in the other hand. Alternatively it may be held in an appropriate tool, e.g. a clamp or a skewer. The rotary tool is then moved over the surfaces to be peeled.

The appliance may be connected to mains via a cord 10, however it is advantageously provided with a rechargeable battery, thereby enabling it to operate independently.

The shaft 3 is fixed to a pulley 11 which is coupled by means of the belt 4 to a pulley 12 for driving the shaft 21 of the rotor 2. In the example shown, the rotor is in a form of a disk and is mounted on the housing 5 by means of a bearing 13. In accordance with a characteristic of the invention, the bearing 13 is mounted to pivot about a fixed pin 14 so as to be capable of following the surface of the fruit or vegetable being peeled. The rotor 2 includes abutments 15 and blades 16 which project several tenths of a millimeter above the abutments 15 which are advantageously disposed in pairs in order to avoid vibration. The abutments 15 act as thickness abutments. The cover 6 is oblong in section so that its portion 17 collects the peel in a manner explained below.

As can be seen in FIG. 3, the rotor bearing 13 which is pivotally mounted on the pin 14 is resiliently returned towards the vertical position by a spring 18. A second spring having identical characteristics may be mounted in opposition thereto. The bearing 13 is also urged towards its rest position by the tension exerted by the belt 4.

Figure 5:
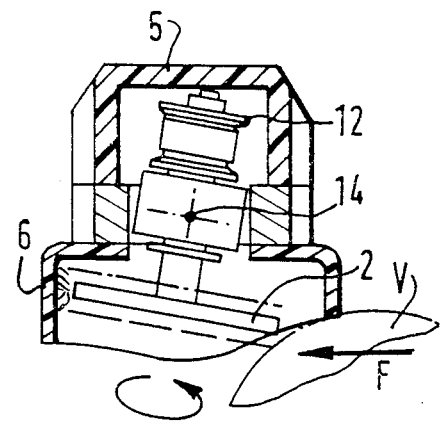
FIG. 5 to 7 are diagrams showing various different positions of the rotary member.
Figure 6:
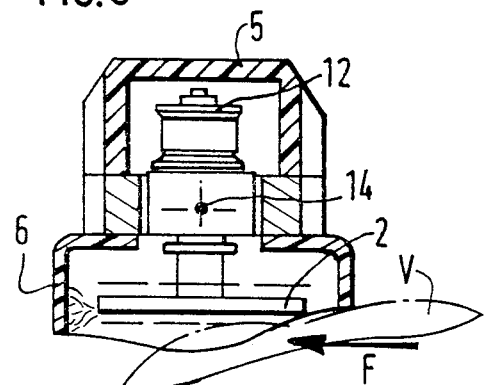
Figure 7:
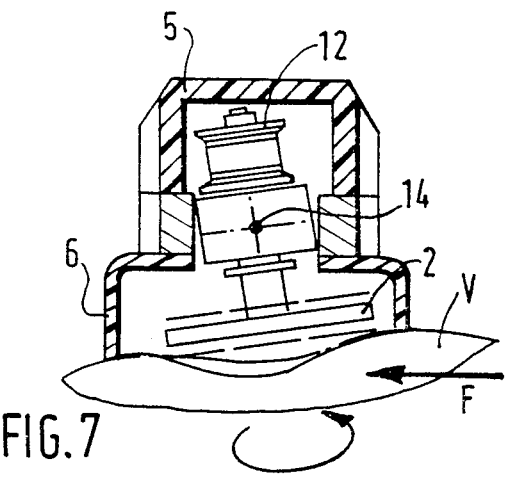

FIGS. 5 to 7 are diagrams showing various positions of the rotor 2 while peeling a fruit or vegetable given an overall reference V.

In the diagrams shown, the rotor rotates counterclockwise. Relative displacements between the tool and the fruit or vegetable is symbolized by arrows F. When beginning peeling (FIG. 5) contact with the product causes the rotor 2 to pivot prior to returning progressively to its initial position (FIG. 6) as a function of the planeness of the product V. The rotor follows the surface of the fruit or vegetable and when said surface is substantially plane, the axis of rotation 21 of the rotor is perpendicular to the surface. As shown in FIG. 7, while the rotor axis is being displaced, it remains aligned with the radius of curvature so as to continuously follow the outline of the product.

Another important problem in an appliance of this type is the problem of skin residue being ejected. Given the high speed of rotation of the rotor and its structure, the peel is practically pulverized. However, it is important for the peel to be directed towards a given location so that it leaves the appliance in controlled manner thus avoids being sprayed in all directions.

This is done by using the turbine effect that results from the very high speed of the rotor. As shown in FIG. 4, the residue expelled outwardly by centrifugal force under the influence of this speed arrives in a chamber 17. It concentrates in this chamber and moves progressively down the wall 19. Fins 20 (FIG. 1) may be added to the top surface of the rotor 2 in order to amplify the aerodynamic phenomena caused by rotation of the turbine.

In the embodiment shown in FIGS. 8 and 9, where the same components have the same references, there can be seen the motor 1 which is fitted with a long shaft 3 onto which the rotor 2 is fixed, with the axis of rotation 21 of the rotor coinciding, in this case, with the shaft 3. In this embodiment, the motor 1 is disposed in the head of the handle and rotary motion is directly transmitted instead of being transmitted by a belt. The shaft 3 includes a key or cam follower 23 which cooperates with a helical slope or cam 26 fixed to the base of the rotor. In this embodiment the rotor 2 is "loosely" mounted on the outlet shaft 3. The rotor rotates in two bearings 27 and 28 enabling the rotor to move in axial translation over a stroke of several millimeters. A spring 18 is interposed between the key 23 and the rotor 2 in a suitably shaped well and it urges the rotor away from the motor. I.e., when there is no pressure being exerted on the rotor by a vegetable, then the rotor occupies its bottom position at the end of the shaft 3, and it moves towards the motor with increasing exerted pressure. Naturally, the thread of the cam 26 is oriented as a function of the direction of rotation of the motor such that the key 23 causes the rotor to be retracted whenever the resistance to cutting increases.

Designating the rotary drive force by "F" and the opposing couple by "R", when "R"=0, the rotor turns freely at the end of the shaft with the spring 18 being extended and the bearing 28 coming into abutment against the key 23. If "R" becomes greater than "F", the rotor 2 rises towards the motor, compressing the spring 18, and as a result the assembly naturally finds a point of balance. This means that pressure against the vegetable is always very gentle, with this assembly making it possible to follow the bumps and hollows of the vegetable. As before, a protective skirt 6 which is advantageously egg-shaped and spherical in shape serves to collect the peel (avoiding spraying) under the flow effect from the rotor 2. The skirt 6 includes a portion 25 constituting an abutment for bearing against the plant to be peeled and facilitating handling. A connection piece 29 interconnects the handle 5 and the protective skirt 6 via beading 30 and a clip, thereby enabling the peeler to be used both by righthanded people and by lefthanded people merely by rotating the skirt 6 through half a turn about the housing 5.

As in the preceding embodiment, the rotor 2 carries a blade 16, and preferably two symmetrically disposed blades in order to avoid vibration, together with depth abutments 15. The cutting depth is thus determined by the height difference between the blades and the abutments. The blades 16 may be radial and vertical, or alternatively they may be curved to have a spoon-shape. The surface of the fruit or vegetable is swept with an epicyclic motion with the area swept on each pass depending on the diameter of the rotor and being 10 mm to 20 mm wide. Finally, the motor couple may be very low, e.g. it may be about 30 gram-centimeters (g.cms), thereby avoiding any danger in use, in co-operation with the rotor retracting in the event of a shock. Eyes are easily eliminated from potatoes by pressing the appliance against them. Finally the peeler is cleaned instantly by causing the rotor 2 to rotate in a bowl of water.

The loss of edible material is much less than with other methods, with said loss being 30% to 50% in industrial peelers, 25% to 30% with kitchen knives, about 20% with a "economizer", and 8% to 12% with a peeler in accordance with the invention.

I claim:

1. An appliance for peeling skin having a thickness from the surface of fruits and vegetables comprising a housing, an electric motor and a rotating member within the housing, the rotating member having a rotation axis, a blade secured to and being rotated by the rotating member, the blade having a height, said rotating member being surrounded by a skirt, the rotation axis of said rotating member being substantially perpendicular to the surface of the fruit or vegetable to be peeled, the height of the blade being substantially equal to the thickness of the skin, the rotating member being rotated at a rotation speed corresponding to a tangential speed at least equal to 7 meters per second.

2. An appliance according to claim 1, characterized in that the axis (21) of the rotating member (2) is mounted in a bearing (13 which is itself pivotally mounted about a pin (14) fixed to the housing (5) and extending orthogonally to the axis (21).

3. An appliance according to claim 1, characterized in that the rotating member (2) is mounted inside a cover (6) having an open bottom, the cover (6) having an oblong section in order to define a chamber (17) for receiving peeled skin.

4. An appliance according to claim 1 characterized in that the electric motor (1) comprises an outlet shaft, the housing (5) comprising a handle forming portion, with the outlet shaft (3) of the motor (1) being mechanically connected to a pulley (12) driving the rotating member comprises by means of a resilient belt (4).

5. An appliance according to claim 1, characterized in that the rotating member comprises a disk whose periphery carries the blade (16) and depth abutments (15).

6. An appliance according to claim 5, characterized in that the rotor (2) constituted by a disk is surmounted by fins (20).

7. An appliance according to claim 4, characterized in that the rotating member (2) is slidably mounted on the shaft (3) of the motor, at the end of the shaft, by means of two bearings (27, 28), and is urged downwardly by a spring (18) interposed between the motor shaft (3) and the rotor (2).

8. An appliance according to claim 7, characterized in that the motor shaft (3) drives the rotor (2) via a pin (23) fixed to the shaft (3) with the ends of the pin bearing against a helical cam (26).

9. An appliance according to claim 1, characterized in that the rotating member (2) is partially surrounded by an egg-shaped skirt (6) capable of occupying two different positions by rotating through half a turn about beading (30) on the housing (5).

10. An appliance according to claim 1, characterized in that the rotating member is slidably mounted on two bearings (27, 28) and is rotated by a belt (4).

* * * * *